Oct. 18, 1955 R. A. FERRIS 2,721,238
SWITCH
Filed Sept. 16, 1952 2 Sheets-Sheet 2
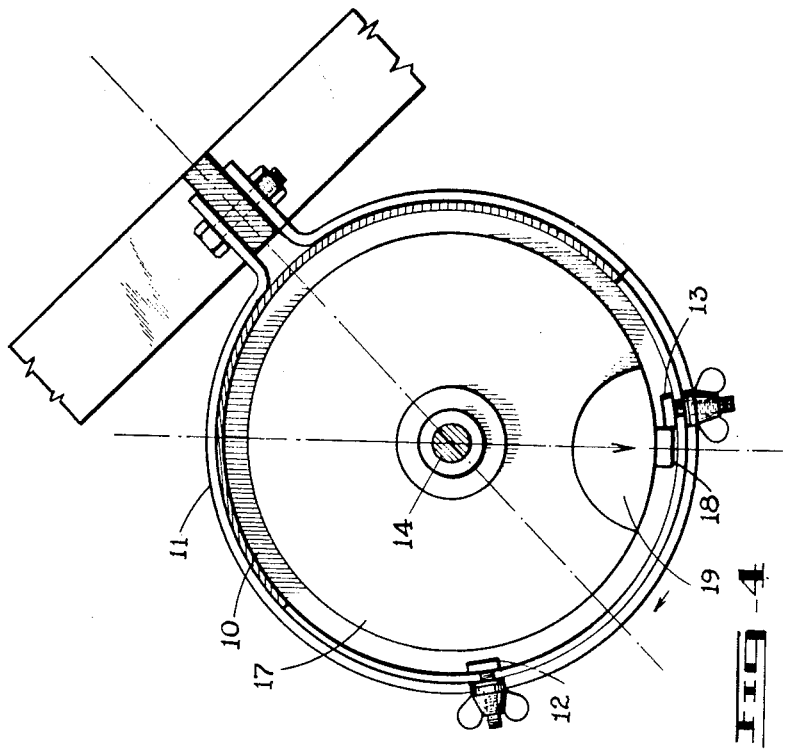
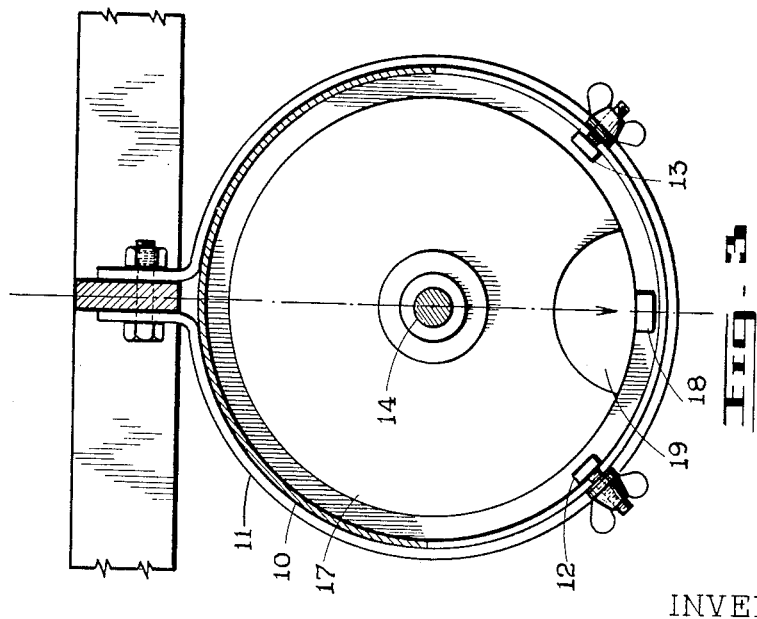
INVENTOR
Russell A. Ferris
Ralph Burch
ATTORNEY

# United States Patent Office 2,721,238
Patented Oct. 18, 1955

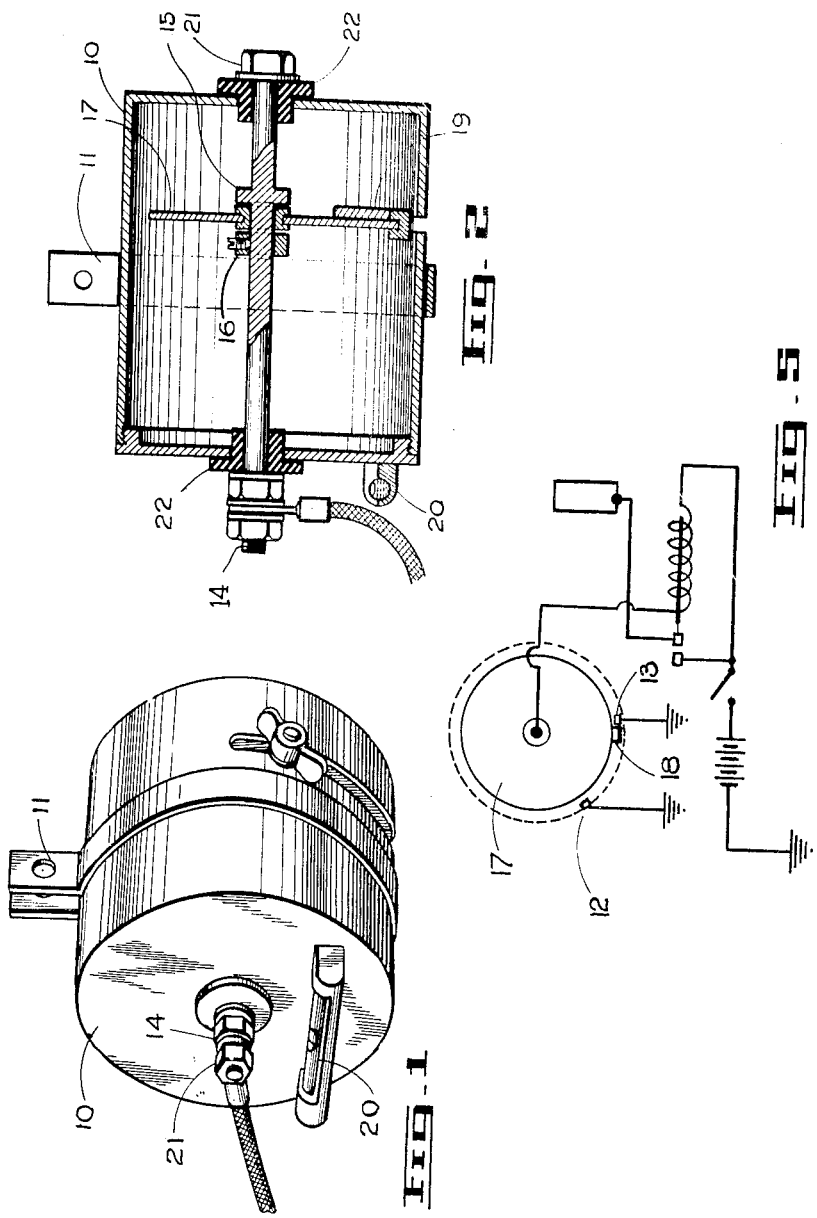

2,721,238

SWITCH

Russell A. Ferris, Copetown, Ontario, Canada

Application September 16, 1952, Serial No. 309,776

1 Claim. (Cl. 200—61.51)

This invention relates to switches for electrical circuits and in particular has reference to a new and improved gyro action switch.

In farming it is common to pull an agricultural implement behind a motorized tractor. For example, a plowshare may be hitched to the rear of a tractor and pulled over an area to be plowed, which area may be rough and uneven studded with hidden tree roots, rocks and other debris.

It is an all too frequent occurrence to have the agricultural implement—in this instance, a plow—catch in some such obstruction thereby causing the tractor to topple over backwards on top of its operator. Many tractor operators have been killed or critically injured in such accidents while the vehicle has, at least, been extensively damaged and frequently burned by exploding gasoline. Also, prevents overturning on either side when working on steep hill sides.

I have found that these dangers can be greatly alleviated by the provision of a new and novel switch operable to deactivate the engine ignition circuit and for other electrical circuits of the tractor or to activate an electric alarm whenever the tractor exceeds a predetermined angle of tilt.

It is evident, of course, that such a switch has many applications other than that described, and may readily be adapted to minimizing overturning of other motorized conveyances such as boats and aircraft, or for use in circumstances where it is desirable to limit the angle of tilt of a structure having integral electrical circuits.

One object of the invention, therefore, is the provision of an electric switch actuable by tilting of the structure upon which it is mounted.

A more detailed object of the invention is the provision of a new and novel gyro action switch wherein the "disc" remains stationary while the "disc" supporting structure is limitedly turned thereabout.

With these and other objects in view which may appear while the description proceeds the invention consists in the novel arrangement of cooperating parts shown in the accompanying drawings forming part of this application and in which:

Figure 1 is a perspective view of one embodiment of the invention;

Figure 2 is a sectional elevational of this embodiment showing a gyro switching element limitedly revolubly mounted on a shaft rigidly secured within a cylindrical housing;

Figure 3 is a sectional view showing the said element in normal disposition relative to two communicatively connected contacts adjustably secured to the said housing;

Figure 4 is a similar view showing the switching element in co-operative engagement with one of the said contacts when the housing has been turned through a predetermined angle, and Figure 5 is a diagrammatic view of one way in which the device may be wired into the ignition circuit of an internal combustion engine.

The device illustrated in the drawings, wherein like reference characters denote like parts throughout, comprises a housing 10 which is adapted to be adjustably secured to the frame of a structure subject to dangerous or undesirable tilting. It may be of any suitable cross section and material, but, in the form shown, is a horizontally disposed cylindrical metal shell closed at its opposite ends. A suitable clamp 11 is provided for adjustably securing the shell 10 to the frame of the structure to be protected. Adjustably secured to the inner and underside of the metal shell 10 on the opposite sides of its vertical axis and at predetermined equal distances therefrom, are suitable switching elements 12 and 13, which elements are in electrical communication with the said shell. Extending axially through the said shell and rigidly secured thereto in electrical isolation is a terminally threaded metal shaft 14 having a plurality of collars 15 and 16. As shown, the said shaft is secured to the shell 10 by a plurality of nuts 21 and is isolated therefrom by suitable insulators 22. A disc 17 is revolubly mounted on the shaft 14, between the said collars. It is, of course, of somewhat lesser diameter than the internal diameter of the shell and is metallic. Extending radially outwardly from the periphery of the disc 17 is a suitable electric contact 18 which is disposed in co-planar relationship with the switching elements 12 and 13. The disc 17 is further provided with a peripherally disposed weight 19 which serves to maintain the contact 18 in downward vertical orientation. A spirit level 20 is secured to one end of the shell 10 for setting the switching elements 12 and 13 at predetermined equal and opposite distances from the vertically oriented contact 18.

In operation the shell 10 is clamped to the frame of the structure to be protected and is set by the spirit level 20 in a manner such that the preadjusted switch elements 12 and 13 are disposed at equal and opposite sides of the vertically oriented switch contact 18. It is assumed, of course that adjustment is made with the structure on level ground, and that the angular spacing between the switch elements 12 and 13 is somewhat less than the critical angle of tilt of the structure. If, now, for any reason the structure is caused to tilt, the shell 10 will be turned about the disc 17, and at the predetermined angle of tilt, one or the other of the communicatively connected switch elements 12 and 13 will be in connection with the vertically oriented contact 18.

It is evident that such a switch may be adapted to short out the ignition circuit of the engine of a tractor or other such conveyance. For example, in Fig. 5 the shell 10 and switch elements 12 and 13 are shown connected to the grounded line of the primary of an usual ignition circuit, while the contact 18 is shown connected to the ungrounded line of the said circuit. As shown, the device has been actuated by tilting of the structure in which the engine ignition circuit is disposed, and the ignition circuit thereby has been short circuited.

It is not intended that the device be limited to the arrangement shown and described as it is obvious that other embodiments of the invention may be provided without departing from the basic structure. For example the device could be formed largely of transparent plastic and mounted on the vehicle in a position where the action can be readily observed by the operator of the vehicle.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the construction, combination and arrangement of co-operating parts may be resorted to within the scope of what is claimed without departing from the spirit of the invention.

I claim:

A switch comprising a cylindrical shell having a circumferential slot in the wall thereof, a clamp adjustably supporting said shell in a horizontal plane, a fixed shaft extending axially through said shell and insulated therefrom, opposed electrical contacts adjustably mounted in the slot of said shell, a disc revolubly mounted on said shaft in alinement with said slot, a weight carried by said disc adjacent its periphery, and an electrical contact projecting radially from said disc adjacent said weight for alternate engagement with said opposed contacts upon rotation of said shell.

References Cited in the file of this patent

UNITED STATES PATENTS

| | | |
|---|---|---|
| 986,714 | Hull | Mar. 14, 1911 |
| 2,263,230 | Young | Nov. 18, 1941 |
| 2,399,350 | Holman | Apr. 30, 1946 |